(12) United States Patent
Yang et al.

(10) Patent No.: US 9,007,346 B2
(45) Date of Patent: Apr. 14, 2015

(54) HANDWRITING SYSTEM AND SENSING METHOD THEREOF

(71) Applicant: Pixart Imaging Inc., Hsinchu (TW)

(72) Inventors: Shu-Sian Yang, Hsinchu (TW); Han-Ping Cheng, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 171 days.

(21) Appl. No.: 13/664,388

(22) Filed: Oct. 30, 2012

(65) Prior Publication Data

US 2013/0106786 A1 May 2, 2013

(30) Foreign Application Priority Data

Nov. 1, 2011 (TW) .............................. 100139787 A

(51) Int. Cl.
*G06F 3/042* (2006.01)
(52) U.S. Cl.
CPC ...................................... *G06F 3/042* (2013.01)
(58) Field of Classification Search
USPC .......................... 345/156–167, 173–175, 207; 178/18.01–18.06
See application file for complete search history.

(56) References Cited

U.S. PATENT DOCUMENTS

| | | | | |
|---|---|---|---|---|
| 2003/0218760 A1* | 11/2003 | Tomasi et al. | ................. | 356/614 |
| 2004/0108990 A1* | 6/2004 | Lieberman et al. | ........... | 345/156 |
| 2010/0321309 A1* | 12/2010 | Lee et al. | ...................... | 345/173 |
| 2011/0199338 A1* | 8/2011 | Kim | ............................. | 345/175 |
| 2011/0254811 A1* | 10/2011 | Lawrence et al. | ............. | 345/175 |
| 2012/0032921 A1* | 2/2012 | Lin et al. | ..................... | 345/175 |

FOREIGN PATENT DOCUMENTS

| | | |
|---|---|---|
| TW | 200836086 A | 9/2008 |
| TW | M350758 U | 2/2009 |
| TW | 201101148 A1 | 1/2011 |

\* cited by examiner

*Primary Examiner* — Pegeman Karimi
(74) *Attorney, Agent, or Firm* — Cheng-Ju Chiang

(57) ABSTRACT

A handwriting system includes a first light source module, a second light source module, an image sensing device and a processing circuit. The first light source module is configured to provide a first light to illuminate an object on a plane. The second light source module is configured to provide a second light to illuminate the object on the plane, wherein the second light source module is disposed under the first light source module. The image sensing device is disposed above the plane and configured to capture an image of the object reflecting the first light only or an image of the object reflecting the first and the second lights both. The processing circuit is electrically connected to the image sensing device and configured to receive the image captured by the image sensing device and generate control information according to light-spot information in the captured image.

32 Claims, 4 Drawing Sheets

HANDWRITING SYSTEM AND SENSING METHOD THEREOF

TECHNICAL FIELD

The present invention relates to a technology in a touch control field, and more particularly to a plurality of handwriting systems and sensing methods thereof.

BACKGROUND

Multi-touch mouse (for example, EvoMouse) is a type of handwriting system that allows a user to use his/or her finger gestures to control a computer system. This handwriting system, basically, is realized by first emitting a plane light parallel to a plane (for example, a desktop), capturing a light spot formed by the plane light reflected from an object (for example, a user's finger) on the desktop, and then calculating the object's position so as to determine a corresponding operation performed by the user.

However, the conventional handwriting system usually uses one light spot to calculate the object's position, so the handwriting system may not successfully distinguish the two operations "touch" and "hover" according to one light spot.

SUMMARY OF EMBODIMENTS

Therefore, one object of the present invention is to provide a plurality of handwriting systems and a hover state and a touch state thereof are distinguishable.

Another object of the present invention is to provide a plurality of sensing methods for the aforementioned handwriting systems.

The present invention provides a handwriting system, which includes a first light source module, a second light source module, an image sensing device and a processing circuit. The first light source module is configured to provide a first light to illuminate an object on a plane. The second light source module is configured to provide a second light to illuminate the object on the plane, wherein the second light source module is disposed under the first light source module. The image sensing device is disposed above the plane and configured to capture an image of the object reflecting the first light only or an image of the object reflecting the first and the second lights both. The processing circuit is electrically connected to the image sensing device and configured to receive the image captured by the image sensing device and generate control information according to light-spot information in the captured image.

In an embodiment of the present invention, the light-spot information comprises the number of light spots in the captured image.

In an embodiment of the present invention, the processing circuit determines that the object is in a hover state if there is one light spot in the captured image and accordingly generates the control information corresponding to the hover state, and the processing circuit determines that the object is in a touch state if there are two light spots in the captured image and accordingly generates the control information corresponding to the touch state.

The present invention further provides a sensing method of a handwriting system. The handwriting system comprises a first light source module, a second light source module and an image sensing device. The first light source module is configured to provide a first light to illuminate an object on a plane. The second light source module is configured to provide a second light to illuminate the object on the plane. The second light source module is disposed under the first light source module. The image sensing device is disposed above the plane and configured to capture an image of the object reflecting the first light only or an image of the object reflecting the first and the second lights both. The sensing method comprises steps of: obtaining an image captured by the image sensing device; and determining that the object is in a hover state or a touch state according to light-spot information in the captured image.

In an embodiment of the present invention, the light-spot information comprises the number of light spots in the captured image.

The present invention further provides a handwriting system, which includes a light source module, an image sensing device and a processing circuit. The light source module is configured to at least produce a first light and a second light. The image sensing device is configured to capture an image of the object reflecting the first light only or an image of the object reflecting the first and the second lights both. The processing circuit is electrically connected to the image sensing device and configured to receive the image captured by the image sensing device and generate control information according to the captured image.

The present invention further provides a handwriting system, which includes a light source module, an image sensing device and a processing circuit. The light source module is for at least producing a first light and a second light. The image sensing device is for capturing an image of an object reflecting the first light only or an image of the object reflecting the first and the second lights both. The processing circuit is electrically connected to the image sensing device and for, when receiving the image captured by the image sensing device, generating position information of the object according to the captured image.

In summary, the handwriting system according to the present invention first emits an upper light and a lower light to illuminate an object, and then generates control information according to light-spot information (for example, the number of light spots) in an image of the object reflecting either the upper light only or the upper and the lower lights both. Specifically, if the captured image includes only one light spot, the handwriting system determines that the object is in a hover state and accordingly generates control information corresponding to the hover state. Alternatively, if the captured image includes two light spots, the handwriting system determines that the object is in a touch state and accordingly generates control information corresponding to the touch state. Therefore, the handwriting system according to the present invention can distinguish the two operations of hover and touch from each other. In addition, the handwriting system according to the present invention can further generate the object's position information based on the captured image.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

First Embodiment

Figure 1:
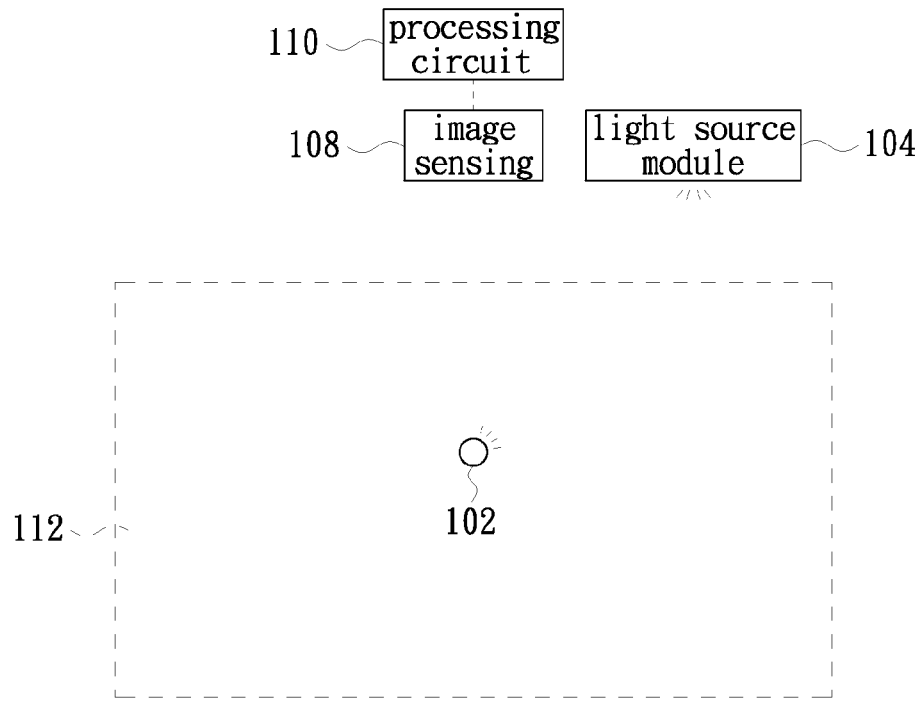
FIG. 1 is a schematic top view of a handwriting system in accordance with a first embodiment of the present invention.

FIG. 1 is a schematic top view of a handwriting system in accordance with a first embodiment of the present invention. As shown, the handwriting system includes a light source module 104, a light source module 106 (not shown in FIG. 1, but will be described in FIG. 2), an image sensing device 108 and a processing circuit 110, which is electrically connected to the image sensing device 108. The light source modules 104, 106 are configured to respectively produce a first and a second lights to illuminate an object 102 (for example, a user's index finger) on a plane 112. In this embodiment, the plane 112 is a parallelogram, and specifically is a rectangle in a preferred embodiment. In addition, the plane 112 can be a virtual plane and its size is defined by a software installed in the processing circuit 110 or defined by four reference objects respectively arranged at the four corners of the plane 112.

Figure 2:
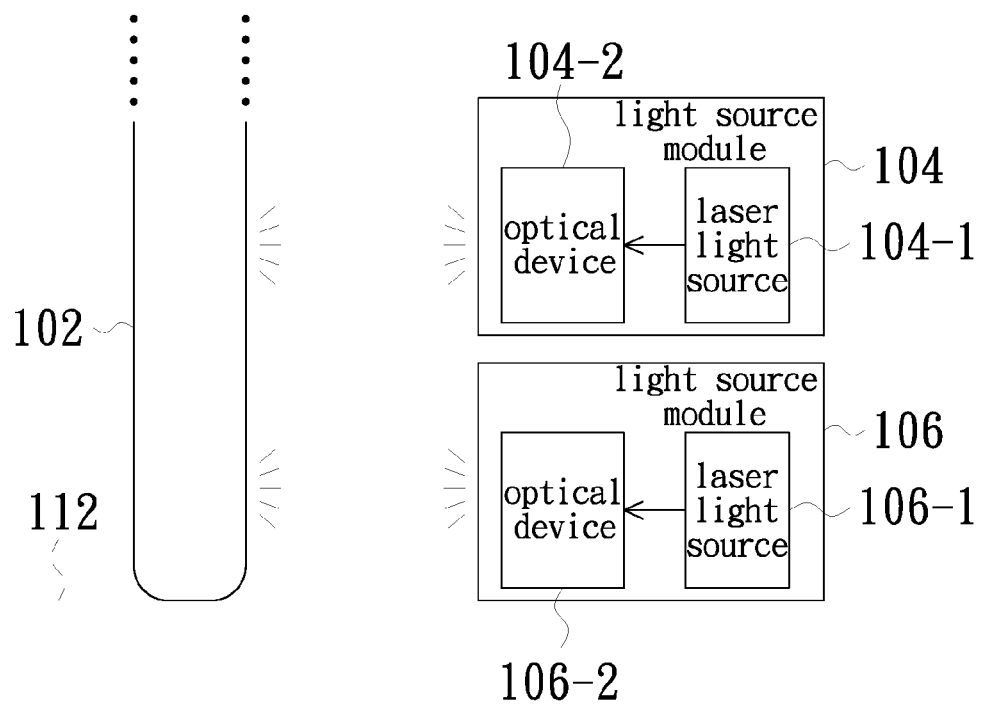
FIG. 2 is a schematic view illustrating the disposing position of the two light source modules in FIG. 1.

The light source module 106 is disposed under the light source module 104, as shown in FIG. 2. The light source module 104 includes a laser light source 104-1, which is configured to produce a first line light, and an optical device 104-2, which is configured to convert the first line light into the first light to illuminate toward and in parallel with the plane 112. The light source module 106 includes a laser light source 106-1, which is configured to produce a second line light, and an optical device 106-2, which is configured to convert the second line light into the second light to illuminate toward and in parallel with the plane 112. Accordingly, there will be only one light spot on a surface of the object 102 opposite to the handwriting system if the object 102 enters into an emitting range of the first light only; alternatively, there will be two light spots on a surface of the object 102 opposite to the handwriting system if the object 102 enters into the emitting ranges of the first and the second lights both.

In this embodiment, the optical devices 104-2, 106-2 each can be implemented with a cylindrical lens or a Micro-Electro-Mechanical Scanning (MEMS) mirror. The optical devices 104-2, 106-2, if each is implemented with a cylindrical lens, are configured to illuminate the first and the second lights with a plane light manner toward and in parallel with the plane 112 through converting the first and the second line lights produced by the laser light sources 104-1, 106-1, respectively. The optical devices 104-2, 106-2, if each is implemented with an MEMS mirror, are configured to illuminate the first and the second lights toward and in parallel with the plane 112 through changing the emitting directions of the first and the second line lights produced by the laser light sources 104-1, 106-1, respectively. Because the first and the second lights are emitted toward and in parallel with the plane 112, a certain space above the plane 112 is in the emitting ranges of the first and the second lights both.

Please refer back to FIG. 1. The image sensing device 108, disposed on the plane 112, is configured to capture an image of the object 102 either with one light spot, which is derived from the first light only, or two light spots, which are derived from the first and the second lights both. In other words, through properly arranging the two light source modules 104, 106 relative to each other, a surface of the object 102 opposite to the light source modules 104, 106 can respectively have one or two light spots thereon without any light-spot overlap in response to the object 102 is being illuminated by either the first light only or the first and the second lights both. And thus, once receiving a captured image of the object 102 from the image sensing device 108, the processing circuit 110 can correctly generate control information by the light-spot information (for example, the number of the light spots on the object 102) in the captured image.

In this embodiment, if the light-spot information indicates that there is only one light spot in the captured image (in other words, only the first light is reflected by the object 102), the processing circuit 110 determines that the object 102 is in a hover state and accordingly generates control information corresponding to the hover state. Alternatively, if the light-spot information indicates that there are two light spots in the captured image (in other words, the first and the second lights both are reflected by the object 102), the processing circuit 110 determines that the object 102 is in a touch state and accordingly generates control information corresponding to the touch state.

Furthermore, the processing circuit 110 is further configured to, when the object 102 is determined as being in a hover state, calculate a position of the object 102 relative to the plane 112 based on image characteristics and the image position of the one light spot in the image captured by the image sensing device 108; alternatively, the processing circuit 110 is further configured to, when the object 102 is determined as being in a touch state, calculate a position of the object 102 relative to the plane 112 based on image characteristics and the image position of a selected one of the two light spots in the image captured by the image sensing device 108; wherein the image characteristics include at least the brightness or the size of the light spot. Moreover, in order to avoid a misreading of the light spot(s) on the object 102, the first and the second lights can be configured to have different flash frequencies or different wavelengths. And thus, the handwriting system according to the present invention can distinguish the two operations of touch and hover from each other.

It is to be noted that each of the light source modules 104, 106 can be implemented with a plurality of laser light sources for producing a plane light. That is, through arranging these laser light sources in a row parallel to the plane 102 in each of the light source modules 104, 106, the light source modules 104, 106 each can emit a plane light without the need of the optical device. In addition, the image sensing device 108 and the light source modules 104, 106 are disposed, without a limitation, on a corner of the plane 112.

Figure 3:
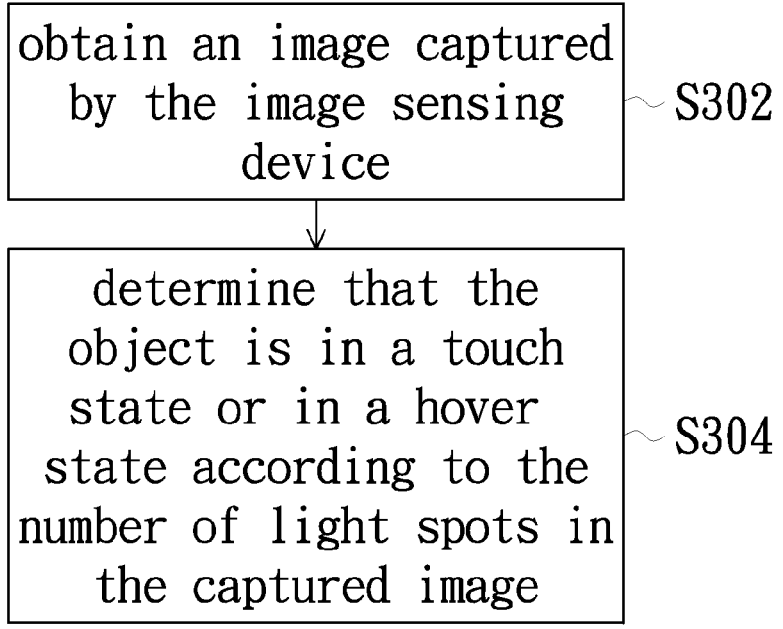
FIG. 3 is a flow chart illustrating a sensing method adapted to use with the handwriting system according to the present invention.

Therefore, those ordinarily skilled in the art can obtain a sensing method adapted to use with a handwriting system derived from the basic operation steps of the handwriting system in the present invention. FIG. 3 is a flow chart illustrating a sensing method adapted to use with the handwriting system according to the present invention. As described above, the handwriting system includes a first light source module, a second light source module and an image sensing device. The first and the second light source modules are configured to respectively provide a first and a second lights to illuminate an object on a plane; wherein the second light source module is disposed under the first light source module. The image sensing device is disposed on the plane and is configured to capture an image of the object either with one light spot, which is derived from the first light only, or two light spots, which are derived from the first and the second lights both. The sensing method includes the steps of: obtaining an image captured by the image sensing device (step S302); and determining that the object is in a touch state or a hover state according to light-spot information (for example, the number of the light spots) in the captured image (step S304).

Specifically, the object is determined being in a hover state if there is only one light spot in the captured image; alternatively, the object is determined being in a touch state if there are two light spots in the captured image.

Second Embodiment

Compared with the handwriting system according to the first embodiment, the handwriting system according to the second embodiment adopts only one light source module for producing the first and the second lights both. The handwriting system according to the second embodiment will be described in detail in FIGS. 4, 5.

Figure 4:
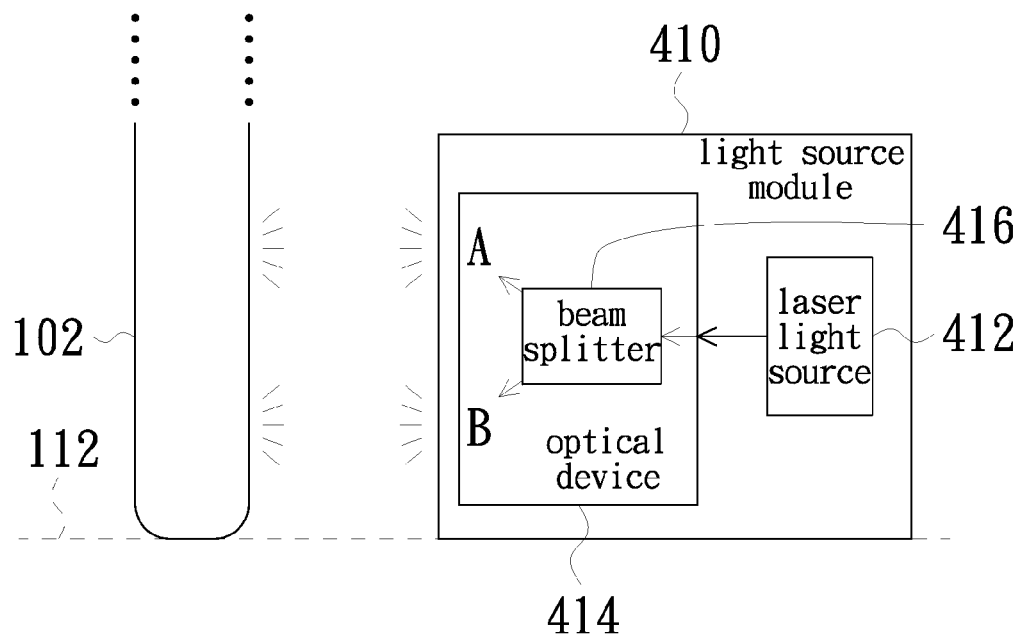
FIG. 4 is a schematic view of a light source module adopted in the handwriting system in accordance with the second embodiment of the present invention.

FIG. 4 is a schematic view of a light source module adopted in the handwriting system in accordance with the second embodiment of the present invention. As shown, the light source module 410, configured to produce the first and the second lights to illuminate the object 102 on the plane 112, includes a laser light source 412 and an optical device 414; wherein the optical device 414 includes a beam splitter 416. The beam splitter 416 is configured to split the light emitted from the laser light source 412 into a first line light A and a second line light B. The other component(s) (not shown) in the optical device 414 then converts the first line light A and the second line light B into the first and the second plane lights, respectively.

Figure 5:
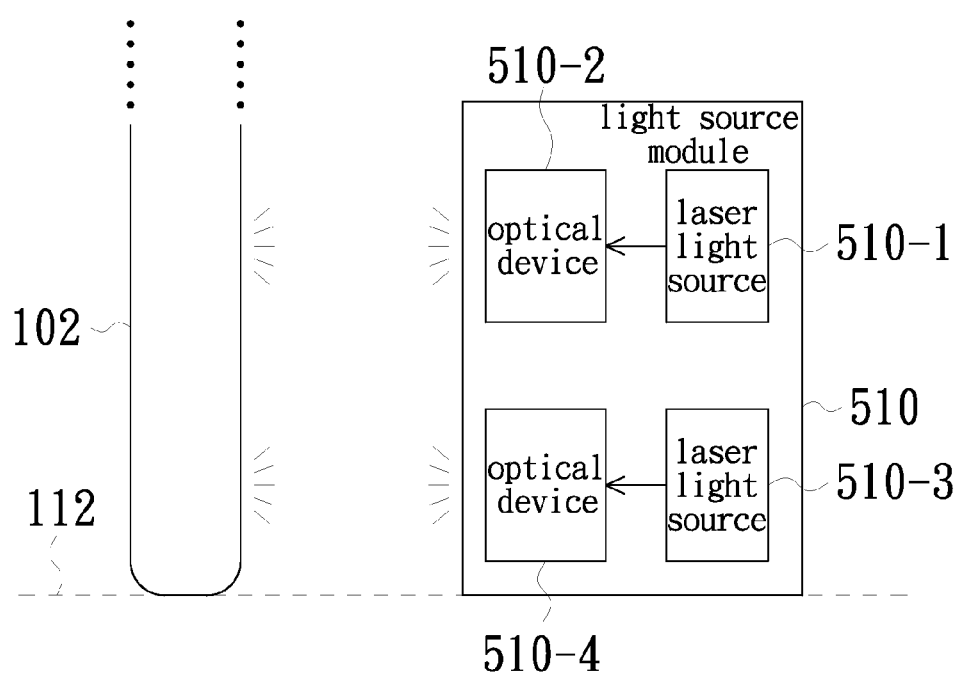
FIG. 5 is an alternative view of the light source module adopted in the handwriting system in accordance with the second embodiment of the present invention.

FIG. 5 is an alternative view of the light source module adopted in the handwriting system in accordance with the second embodiment of the present invention. As shown, the light source module 510, configured to produce the first and the second lights to illuminate the object 102 on the plane 112, includes laser light sources 510-1, 510-3 and optical devices 510-2, 510-4; wherein the laser light source 510-3 and the optical device 510-4 are disposed under the laser light source 510-1 and the optical device 510-2, respectively. The laser light source 510-1 is configured to produce a first laser light and the optical device 510-2 is configured to convert the first laser light into the first plane light to illuminate the plane 112. The laser light source 510-3 is configured to produce a second laser light and the optical device 510-4 is configured to convert the second laser light into the second plane light to illuminate the plane 112.

Please refer back to FIG. 1, in the handwriting system according to the present invention it is to be noted that the processing circuit 110 can be further configured to generate position information of the object 102 based on an image of the object 102 either presenting one light spot, which is derived from the first light only, or two light spots, which are derived from the first and the second lights both once the image is transmitted from the image sensing device 108 thereto. Once generating the position information, no matter it is derived from the image of the object 102 reflecting the first light or the first and the second lights both, the processing circuit 110 is further configured to control a cursor on a display screen based on the position information of the object 102 indicating that a position variation relative to the handwriting system. For example, if the captured image shows only one light spot and the position information derived from the captured image indicates that the object 102 has a horizontal movement relative to the handwriting system, the processing circuit 110 then controls the cursor to have a vertical movement on the display screen, and vice versa.

In addition, the processing circuit 110 is configured to, when the image captured by the sensing device 108 indicates that there are two light spots on the object 102 which are derived from the first and the second lights, generate control information which is, for example, an interaction command for a virtual object located to which a cursor points on a display screen.

Figure 6:
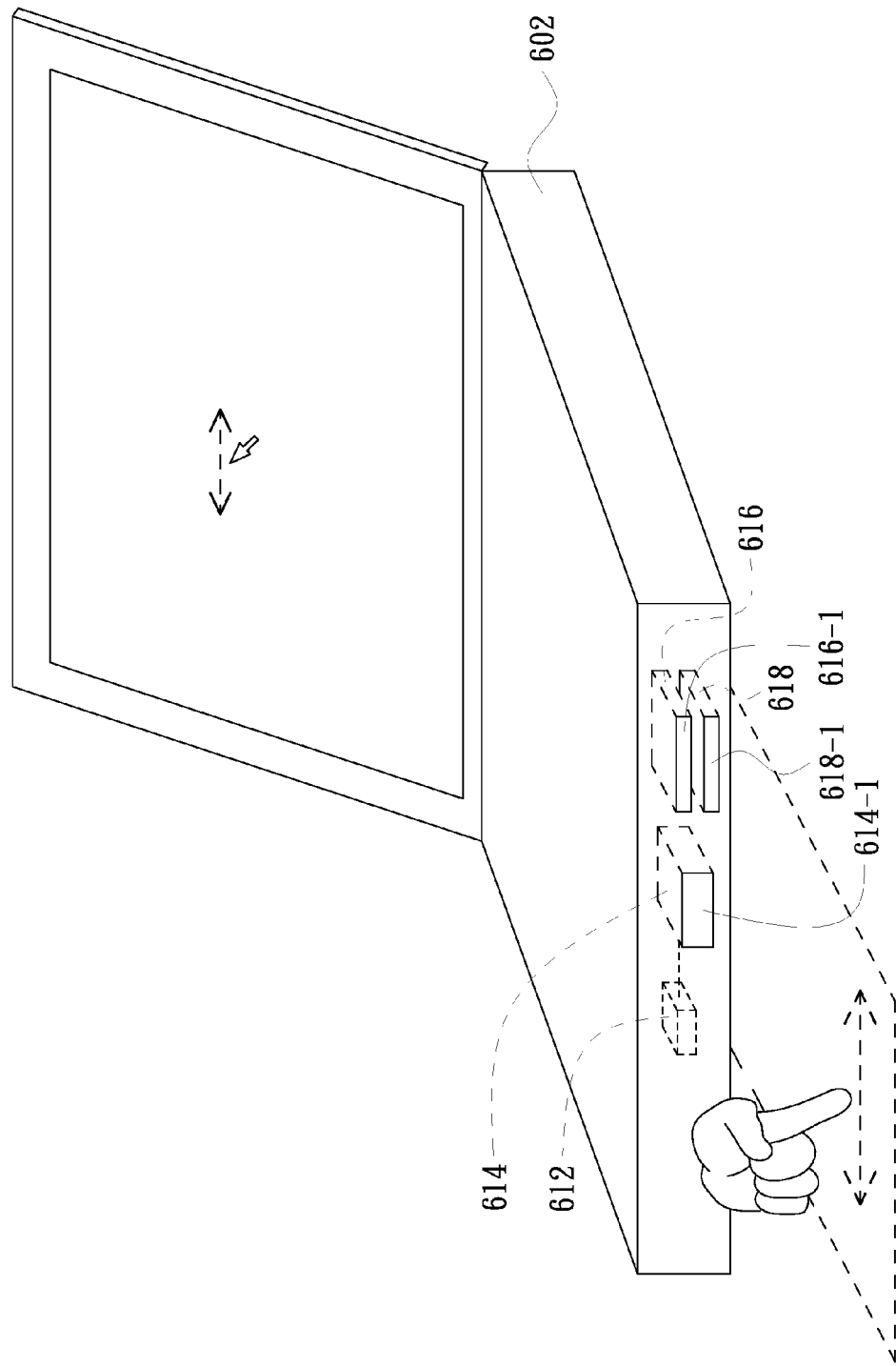
FIG. 6 is a schematic view illustrating that a notebook computer is integrated with the handwriting system according to the present invention.

In addition, the handwriting system according to the present invention is adapted to be integrated into an electronic apparatus (for example, a notebook computer) or other types of input devices (for example, a keyboard). Specifically, the handwriting system according to the present invention is adapted to be integrated into a side wall of an electronic apparatus or an input device in a preferred embodiment. FIG. 6 is a schematic view illustrating that a notebook computer is integrated with the handwriting system according to the present invention. As shown, one side wall of the notebook 602 is integrated with a processing circuit 612, an image sensing device 614 and light source modules 616, 618. To make the light source modules 616, 618 emit lights to an object (for example, a user's index finger) more efficiently and the image sensing device 614 can capture an image of the object correctly, in a preferred embodiment the image sensing device 614 and the light source modules 616, 618 have their light-sensing surface 614-1 and the light-emitting surfaces 616-1, 618-1 exposed from a shell of the notebook 602, respectively; or a portion of the shell of the notebook computer 602, opposite to the image sensing device 614 and the light source modules 616, 618, are made of transparent materials.

In summary, the handwriting system according to the present invention first emits an upper light and a lower light to illuminate an object, and then generates control information according to light-spot information (for example, the number of light spots) in an image of the object reflecting either the upper light only or the upper and the lower lights both. Specifically, if the captured image includes only one light spot, the handwriting system determines that the object is in a hover state and accordingly generates control information corresponding to the hover state. Alternatively, if the captured image includes two light spots, the handwriting system determines that the object is in a touch state and accordingly generates control information corresponding to the touch state. Therefore, the handwriting system according to the present invention can distinguish the two operations of hover and touch from each other. In addition, the handwriting system according to the present invention can further generate the object's position information based on the captured image.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A handwriting system, comprising:
   a first light source module for providing a first light to illuminate an object on a plane;
   a second light source module for providing a second light to illuminate the object on the plane, wherein the second light source module is disposed under the first light source module;
   an image sensing device disposed above the plane for capturing an image of the object reflecting the first light only or an image of the object reflecting the first and the second lights both; and
   a processing circuit electrically connected to the image sensing device for receiving the image captured by the image sensing device and generating control information according to light-spot information in the captured image;
   wherein the processing circuit is further configured to control a cursor on the display screen based on the position information of the object indicating that a position variation of the object relative to the handwriting system;
   wherein when the captured image has one light spot, a horizontal movement of the one light spot in the captured image represents a vertical movement of the cursor on the display screen and a vertical movement of the one light spot in the captured image represents a horizontal movement of the cursor on the display screen.

2. The handwriting system according to claim 1, wherein the light-spot information comprises the number of light spots in the captured image.

3. The handwriting system according to claim 2, wherein the processing circuit determines that the object is in a hover state if there is one light spot in the captured image and accordingly generates the control information corresponding to the hover state, and the processing circuit determines that the object is in a touch state if there are two light spots in the captured image and accordingly generates the control information corresponding to the touch state.

4. The handwriting system according to claim 3, wherein the processing circuit, if the object is determined being in the hover state, is further configured to calculate the object's position relative to the plane according to image characteristics of the one light spot and the one light spot's image position in the image sensing device; the processing circuit, if the object is determined being in the touch state, is further configured to calculate the object's position relative to the plane according to image characteristics of one of the two light spots and the selected light spot's image position in the image sensing device.

5. The handwriting system according to claim 4, wherein the image characteristics comprises at least one of a light-spot brightness and a light-spot size.

6. The handwriting system according to claim 1, wherein the first and the second light source modules each comprise:
   a laser light source configured to produce a line light; and
   an optical device configured to convert the line light into the first or the second light.

7. The handwriting system according to claim 6, wherein the optical device can be implemented with a cylindrical lens or a Micro-Electro-Mechanical Scanning (MEMS) mirror, the optical device, if is implemented with a cylindrical lens, is configured to convert the line light into the first or the second lights with a plane light manner; the optical device, if is implemented with a Micro-Electro-Mechanical Scanning (MEMS) mirror, is configured to change an emitting direction of the line light so as to form the first or the second light.

8. The handwriting system according to claim 6, wherein the first and the second light source modules each further comprise:
   a plurality of laser light sources arranged in parallel and configured to produce the first or the second light.

9. The handwriting system according to claim 1, wherein the first and the second lights have different flashing frequencies or different wavelengths.

10. The handwriting system according to claim 1, wherein the shape of the plane is a parallelogram.

11. The handwriting system according to claim 1, wherein the plane is a virtual plane.

12. A sensing method of a handwriting system, the handwriting system comprising a first light source module, a second light source module and an image sensing device, the first light source module being configured to provide a first light to illuminate an object on a plane, the second light source module being configured to provide a second light to illuminate the object on the plane, the second light source module being disposed under the first light source module, the image sensing device being disposed above the plane and being configured to capture an image of the object reflecting the first light only or an image of the object reflecting the first and the second lights both, the sensing method comprising steps of:
   obtaining an image captured by the image sensing device; and
   determining that the object is in a hover state or a touch state according to light-spot information in the captured image;
   wherein the processing circuit is further configured to control a cursor on the display screen based on the position information of the object indicating that a position variation of the object relative to the handwriting system;
   wherein when the captured image has one light spot, a horizontal movement of the one light spot in the captured image represents a vertical movement of the cursor on the display screen and a vertical movement of the one light spot in the captured image represents a horizontal movement of the cursor on the display screen.

13. The sensing method according to claim 12, wherein the light-spot information in the captured image comprises the number of light spots in the captured image.

14. The sensing method according to claim 13, wherein the object is determined being in a hover state if the light-spot information indicates that there is one light spot in the captured image; the object is determined being in a touch state if the light-spot information indicates that there are two light spots in the captured image.

15. The sensing method according to claim 14, further comprising steps of:
   calculating the object's position relative to the plane according to image characteristics of the one light spot and the one light spot's image position in the image sensing device if the object is determined being in the hover state; and
   calculating the object's position relative to the plane according to image characteristics of one of the two light spots and the selected light spot's image position in the image sensing device if the object is determined being in the touch state.

16. The sensing method according to claim 15, wherein the image characteristics comprises at least one of a light-spot brightness and a light-spot size.

17. The sensing method according to claim 12, wherein the first and the second lights have different flashing frequencies or different wavelengths.

18. The sensing method according to claim 12, wherein the shape of the plane is a parallelogram.

19. The sensing method according to claim 12, wherein plane is a virtual plane.

20. A handwriting system, comprising:
a light source module for at least producing a first light and a second light;
an image sensing device for capturing an image of the object reflecting the first light only or an image of the object reflecting the first and the second lights both; and
a processing circuit electrically connected to the image sensing device for receiving the image captured by the image sensing device and generating control information according to the captured image;
wherein the processing circuit is further configured to control a cursor on the display screen based on the position information of the object indicating that a position variation of the object relative to the handwriting system;
wherein when the captured image has one light spot, a horizontal movement of the one light spot in the captured image represents a vertical movement of the cursor on the display screen and a vertical movement of the one light spot in the captured image represents a horizontal movement of the cursor on the display screen.

21. The handwriting system according to claim 20, wherein the processing circuit determines that the object is in a hover state if there is one light spot in the captured image and accordingly generates the control information corresponding to the hover state, and the processing circuit determines that the object is in a touch state if there are two light spots in the captured image and accordingly generates the control information corresponding to the touch state.

22. The handwriting system according to claim 21, wherein the processing circuit, if the object is determined being in the hover state, is further configured to calculate the object's position relative to the plane according to image characteristics of the one light spot and the one light spot's image position in the image sensing device; the processing circuit, if the object is determined being in the touch state, is further configured to calculate the object's position relative to the plane according to image characteristics of one of the two light spots and the selected light spot's image position in the image sensing device.

23. The handwriting system according to claim 22, wherein the image characteristics comprises at least one of a light-spot brightness and a light-spot size.

24. The handwriting system according to claim 20, wherein the light source module comprises:
a laser light source; and
an optical device comprising a beam splitter configured to split a light emitted from the laser light source into a first line light and a second line light and convert the first line light and the second line light into the first and the second lights with a plane light manner, respectively.

25. The handwriting system according to claim 20, wherein the light source module comprises:
a first laser light source configured to produce a first laser light;
a first optical device configured to convert the first laser line light into the first light with a plan light manner;
a second laser light source configured to produce a second laser light; and
a second optical device configured to convert the second laser line light into the second light with the plan light manner.

26. The handwriting system according to claim 20, wherein the first and the second lights have different flashing frequencies or different wavelengths.

27. A handwriting system, comprising:
a light source module for at least producing a first light and a second light;
an image sensing device for capturing an image of an object reflecting the first light only or an image of the object reflecting the first and the second lights both; and
a processing circuit electrically connected to the image sensing device for, when receiving the image captured by the image sensing device, generating position information of the object according to the captured image;
wherein the processing circuit is further configured to control a cursor on the display screen based on the position information of the object indicating that a position variation of the object relative to the handwriting system;
wherein when the captured image has one light spot, a horizontal movement of the one light spot in the captured image represents a vertical movement of the cursor on the display screen and a vertical movement of the one light spot in the captured image represents a horizontal movement of the cursor on the display screen.

28. The handwriting system according to claim 27, wherein the light source module comprises:
a laser light source; and
an optical device comprising a beam splitter configured to split a light emitted from the laser light source into a first line light and a second line light and convert the first line light and the second line light into the first and the second lights with a plane light manner, respectively.

29. The handwriting system according to claim 27, wherein the light source module comprises:
a first laser light source configured to produce a first laser light;
a first optical device configured to convert the first laser light into the first light with a plan light manner;
a second laser light source configured to produce a second laser light; and
a second optical device configured to convert the second laser light into the second light with the plan light manner.

30. The handwriting system according to claim 27, wherein the first and the second lights have different flashing frequencies or different wavelengths.

31. The handwriting system according to claim 27, wherein the processing circuit is further configured to output control information when the image captured by the image sensing device presents the object reflecting the first and the second lights both.

32. The handwriting system according to claim 31, wherein the control information comprises an interaction command for a virtual object located to which a cursor points on a display screen.

* * * * *